United States Patent
Andersen et al.

(10) Patent No.: US 9,777,188 B2
(45) Date of Patent: Oct. 3, 2017

(54) ALPHA,OMEGA-HYDROXY-FUNCTIONALIZED OLIGOESTER AS ADHESION PROMOTER IN AQUEOUS BASECOATS

(71) Applicant: BASF Coatings GmbH, Münster (DE)

(72) Inventors: Audrée Andersen, Münster (DE); Markus Saedler, Münster (DE); Fatmir Raka, Münster (DE); Nicole Freitag, Münster (DE); Britta Schnieders, Meppen (DE); Alexandra Steffens, Münster (DE); Cathrin Corten, Münster (DE); Frederik Fölling, Münster (DE)

(73) Assignee: BASF Coatings GmbH, Münster (DE)

( * ) Notice: Subject to any disclaimer, the term of this patent is extended or adjusted under 35 U.S.C. 154(b) by 103 days.

(21) Appl. No.: 14/766,553

(22) PCT Filed: Feb. 7, 2014

(86) PCT No.: PCT/EP2014/052457
§ 371 (c)(1),
(2) Date: Aug. 7, 2015

(87) PCT Pub. No.: WO2014/122274
PCT Pub. Date: Aug. 14, 2014

(65) Prior Publication Data
US 2015/0376446 A1 Dec. 31, 2015

Related U.S. Application Data

(60) Provisional application No. 61/761,750, filed on Feb. 7, 2013.

(30) Foreign Application Priority Data

Feb. 7, 2013 (EP) ..................................... 13154427

(51) Int. Cl.
| | | |
|---|---|---|
| B32B 27/06 | (2006.01) | |
| C09D 167/02 | (2006.01) | |
| C09D 5/02 | (2006.01) | |
| C09D 7/12 | (2006.01) | |
| B05D 7/00 | (2006.01) | |
| B05D 3/02 | (2006.01) | |
| C08L 75/04 | (2006.01) | |

(52) U.S. Cl.
CPC ......... C09D 167/02 (2013.01); B05D 3/0272 (2013.01); B05D 7/532 (2013.01); B05D 7/534 (2013.01); C08L 75/04 (2013.01); C09D 5/02 (2013.01); C09D 7/1233 (2013.01)

(58) Field of Classification Search
CPC .......... C09D 5/00; C09D 7/1233; C09D 7/12; C08K 5/11; B05D 7/534; Y10T 428/31786
See application file for complete search history.

(56) References Cited

U.S. PATENT DOCUMENTS 8,383,724 B2  2/2013  Blum et al.

2008/0234427 A1  9/2008  Glockner et al.
2014/0322539 A1  10/2014  Andersen et al.

FOREIGN PATENT DOCUMENTS

| DE | 10-2004-005207 | 8/2005 |
|---|---|---|
| EP | 1914282 | 4/2008 |
| WO | WO-2011/000525 | 1/2011 |
| WO | WO-2011/037818 | 3/2011 |
| WO | WO-2013/064506 | 5/2013 |

OTHER PUBLICATIONS

PCT International Preliminary Report on Patentability in PCT/EP2014/052457, dated Aug. 11, 2015, 9 pages.
Paints and Varnishes—Coatings for Automotive Industry—Testing of Resistance to Pressure-Water Jetting, *DIN55662* Dec. 2009, 20 pages.
Determination of Hydroxyl Value—Part 2: Method with Catalyst, *DIN 53240-2*, Nov. 2007, 8 pages.
Paints Varnishes and Plastics—Determination of Non-Volatile-Matter Content, *DIN EN ISO 3251*, Jun. 2008, 14 pages.
Römpp-Lexikon Lacke und Druckfarben, Georg Thieme Verlag, Stuttgart, New York, 1998, 73-74.
Römpp-Lexikon Lacke und Druckfarben, Georg Thieme Verlag, Stuttgart, New York, 1998, 274-276.
Römpp-Lexikon Lacke und Druckfarben, Georg Thieme Verlag, Stuttgart, New York, 1998, 641-642.
Römpp-Lexikon Lacke und Druckfarben, Georg Thieme Verlag, Stuttgart, New York, 1998, 325.
Paints and Varnishes—Determination of Resistance to Humidity, Part 2: Procedure for Exposing Test Specimens in Condensation-Water Atmospheres *DIN EN ISO 6270-2*, 12 pages, 2005.
Binders for Paints and Varnishes—Determination of Acid Value, Titrimetric Method, *DIN EN ISO 3682 (replaced DIN 53402)*, Jun. 1998, 6 pages.
PCT International Search Report in PCT/EP2014/052457, mailed Mar. 24, 2014, 3 pages.
"Preparation of Aqueous Polyester Dispersions for Two-Component Waterborne Polyurethane Coatings and Study of the Properties Thereof", Shenkai Liu, China Excellent Master Dissertations Fulltext Database, Collection I Engineering Science and Technology, No. 3, 2011, published on Mar. 15, 2011, pp. 9-10, 15-16, 18, 20-22, 24-25.

*Primary Examiner* — Shane Fang
(74) *Attorney, Agent, or Firm* — Servilla Whitney LLC

(57) ABSTRACT

Pigmented aqueous basecoat material comprises at least one alpha, omega-hydroxy-functionalized oligoester having an OH number of 25 to 95 mg KOH/g, a theoretical carbon-carbon double bond content of 0.5 to 2.5 mmol/g, a number-average molecular weight of 2500 to 6000 g/mol and a weight-average molecular weight of 15 000 to 30 000 g/mol, the alpha, omega-hydroxy-functionalized oligoester further comprising at least one partially or completely salified acid group, and the sum of the weight percentage fractions of all the alpha, omega-hydroxy-functionalized oligoesters being 0.5 to 10 wt %, based on the total solids fraction of the pigmented aqueous basecoat material. Also provided are a multicoat paint system, a method of producing a multicoat paint system, and use of the above-identified alpha, omega-hydroxy-functionalized oligoester in pigmented aqueous basecoat materials for the purpose of improving adhesion.

15 Claims, No Drawings

ALPHA,OMEGA-HYDROXY-FUNCTIONALIZED OLIGOESTER AS ADHESION PROMOTER IN AQUEOUS BASECOATS

CROSS-REFERENCE TO RELATED APPLICATIONS

This application is the National Stage entry of PCT/EP2014/052457, filed on Feb. 7, 2014, which claims priority to European Application Number 13154427.2, filed on Feb. 7, 2013, and U.S. Ser. No. 61/761,750 filed on Feb. 7, 2013, which are incorporated herein by reference in their entireties.

TECHNICAL FIELD

The invention relates to a pigmented aqueous basecoat material. It further relates to a method for producing a multicoat paint system on a plastics substrate, and also to a multicoat paint system on a plastics substrate. Lastly, the present invention relates to the use of an alpha,omega-hydroxy-functionalized oligoester for improving adhesion in a pigmented aqueous basecoat material.

BACKGROUND

In the context of vehicle finishing, plastics have become established as materials for vehicle parts and also for both interior and exterior vehicle accessory components and components for installation in or on the vehicle. Plastics, just like other materials, are coated, or painted, for decorative reasons (coloring, for example) and/or for technical usefulness (light stability and weather resistance, for example) with corresponding coating compositions. An important prerequisite for a high-quality coating is the adhesion to the substrate, in other words the underlying surface. It is common knowledge that particularly in the coating or painting of plastics, adhesion problems to the plastics substrate, in some cases serious, may occur. To achieve acceptable adhesion of the coating composition in question, such plastics are conventionally subjected to a surface-activating pretreatment. The most frequently employed methods are flame treatment, plasma treatment, and corona discharge.

Also known for the purpose of improving adhesion is the use of adhesion promoter substances, especially chlorinated polyolefins. From an environmental viewpoint, however, their use is very deleterious.

The adhesion promoter substances are employed for example via adhesion primers, which comprise the adhesion promoter substances and which are applied to the plastics substrate in a separate coating operation. Likewise possible is the direct addition of adhesion promoter substances to the coating composition with which the decorative and/or technically useful coating is to be produced. When using aqueous coating compositions, which are becoming more and more widespread in the coating of plastics as well, on environmental grounds, the adhesion problems between plastics substrate and coating composition are particularly striking.

Great problems are caused, for example, in the coating of plastics substrates such as, for example, polypropylene modified with ethylene-propylene-diene copolymers (PP-EPDM) and also polycarbonate modified with polybutadiene terephthalate (PC-PBT) and polyurethane (PUR-RIM). In accordance with the present state of knowledge, PP-EPDM substrates can be coated only after pretreatment by flaming. For PC-PBT and PUR-RIM substrates, no flaming is necessary. However, the wiping of the corresponding substrates with the solvents at least is necessary in order to achieve sufficient adhesion. Even after such pretreatment, however, the adhesion is not sufficient in all possible cases.

SUMMARY

The object of the present invention, therefore, was to improve the adhesion of aqueous pigmented basecoat materials to the adjacent coats. More particularly the object was to improve the adhesion of aqueous pigmented basecoat materials to plastics substrates. This is to be achieved through the use of adhesion promoters in the basecoat material, without the need for a further pretreatment step such as, for example, the flaming of the plastics surface or else wiping with solvents.

The adhesion of said basecoat materials is to be retained even after exposure of the substrate, as for example after weathering. Furthermore, the aqueous pigmented basecoat materials comprising adhesion promoter are to have an excellent shelf life. This means in particular that there is no significant deterioration found in the attainable improvement in adhesion after a number of months of storage.

This object is achieved, surprisingly, by means of a pigmented aqueous basecoat material which is characterized in that it comprises at least one alpha,omega-hydroxy-functionalized oligoester which possesses an OH number of 25 to 95 mg KOH/g, a theoretical carbon-carbon double bond content of 0.5 to 2.5 mmol/g, a number-average molecular weight of 2500 to 6000 g/mol and a weight-average molecular weight of 15 000 to 30 000 g/mol, said alpha,omega-hydroxy-functionalized oligoester further comprising at least one partially or completely salified acid group, and the sum of the weight percentage fractions of all the alpha,omega-hydroxy-functionalized oligoesters being 0.5 to 10 wt %, based on the total solids fraction of the pigmented aqueous basecoat material.

DETAILED DESCRIPTION

The term "basecoat" serves as identification for a color-imparting intermediate coating material which is customary in automotive finishing or general industrial coating and which is applied to a substrate. The basecoat typically forms the first coat in a two-coat finish. The second, topmost coat is then a clearcoat, which protects the basecoat from effects of weathering and also from mechanical and chemical influences.

By complete salification is meant, hereinafter, the deprotonation of all of the acid groups present in the alpha,omega-hydroxy-functionalized oligoester for use in accordance with the invention. For this purpose it is usual to use bases, preferably organic bases. Particular preference is given to using amines. With very particular preference these are dimethylethanolamine (DMEA), triethylamine (TEA), diethylamine, pyridine and $NH_3$. DMEA is especially preferred.

In order to achieve complete deprotonation of said acid groups, it is necessary to use an excess of base. This means that for each equivalent of acid more than one equivalent of base is used.

Partial salification means that less than one equivalent of base is used per equivalent of acid present in said alpha,omega-hydroxy-functionalized oligoester. Based on the amount of acid groups present, preference is given to using 0.2 to 1.0 equivalent, more preferably 0.3 to 0.9 equivalent, and very preferably 0.4 to 0.8 equivalent, of a suitable base.

The amount of base to be used should in each case be selected such that the resultant partially or completely salified product is water-dispersible. This means that the alpha,omega-hydroxy-functionalized oligoester must not be completely water-soluble. A person of ordinary skill in the art knows that the compatibility of an adhesion promoter in water-based coating systems must be such that it accumulates at the interfaces in the coating system, in order thus to be able to improve the adhesion of the adjacent coats. If the water-solubility is too great, then said accumulation at the interfaces does not occur, and there is no improvement in adhesion.

The term "alpha,omega-hydroxy-functionalized oligoester" identifies an oligoester which has a hydroxyl group at each of its opposite ends, identified by alpha and omega, respectively. This means that such an oligoester is terminated at both ends in each case by a monomer unit which carries in each case precisely one hydroxyl group. Where the oligoester is branched, alpha and omega identify the ends of the longest polymer chain in the monomer. The length is measured by the number of monomers incorporated. Furthermore, the possession by said alpha,omega-hydroxy-functionalized oligoester of further hydroxyl groups is not ruled out. In principle it is preferred for the alpha,omega-hydroxy-functionalized oligoester for use in accordance with the invention to possess precisely two hydroxyl groups, one in alpha- and one in omega-position. It is particularly preferred for the alpha,omega-hydroxy-functionalized oligoester for use in accordance with the invention to possess precisely two hydroxyl groups, one in alpha- and one in omega-position, and, furthermore, to be linear.

As already evident from the characteristics specified above, the term "alpha,omega-hydroxy-functionalized oligoester" identifies a mixture of different alpha,omega-hydroxy-functionalized oligoester species having different molecular weights. The alpha,omega-hydroxy-functionalized oligoester for use in accordance with the invention comprises products of polycondensation. As the skilled worker is aware, the implementation of such a polycondensation reaction automatically produces a mixture of said alpha,omega-hydroxy-functionalized oligoesters.

The use of the term "oligo" is intended to indicate that the alpha,omega-hydroxy-functionalized oligoester for use in accordance with the invention comprises comparatively short polyesters which possess small number-average and weight-average molecular weights within the ranges specified above.

Said alpha,omega-hydroxy-functionalized oligoester possesses an OH number of 25 to 95 mg KOH/g, preferably 35 to 85 mg KOH/g and more preferably of 45 to 65 mg KOH/g. The OH number can be determined in accordance with DIN 53240 as follows. The OH groups are reacted by acetylation with an excess of acetic anhydride. The excess acetic anhydride is subsequently cleaved to form acetic acid by addition of water, and the entire acetic acid is back-titrated with ethanolic KOH. The OH number indicates the amount of KOH in mg which is equivalent to the amount of acetic acid bound in the acetylation of 1 g of substance.

With regard to the ranges defined in this patent specification for the number-average and weight-average molecular weights, it is noted at this point that the skilled person will be clear that in every case the only possible combinations of number-average and weight-average molecular weight are those for which the number-weighted is not greater than the weight-average molecular weight.

Said alpha,omega-hydroxy-functionalized oligoester further possesses a number-average molecular weight of 2500 to 6000 g/mol, preferably of 3200 to 5000 g/mol and more preferably of 3500 to 4500 g/mol, and a weight-average molecular weight of 15 000 to 30 000 g/mol, preferably 15 000 to 28 000 g/mol, and more preferably of 20 000 to 26 000 g/mol.

The number-average and weight-average molecular weights are determined by means of gel permeation chromatography using tetrahydrofuran as eluent and using a polystyrene standard. The column material consists of styrene-divinylbenzene copolymers. The alpha,omega-hydroxy-functionalized oligoester is measured in its neutralized form. Neutralization is carried out using DMEA.

It is essential for the invention that said alpha,omega-hydroxy-functionalized oligoester possesses a theoretical carbon-carbon double bond content of 0.5 to 2.5 mmol/g, preferably of 1.5 to 2 mmol/g and more preferably of 1.2 to 1.8 mmol/g. The theoretical carbon-carbon double bond content means the amount of substance of the carbon-carbon double bonds, with mmol as the unit, relative to the mass of the alpha,omega-hydroxy-functionalized oligoester, with gram as the unit. Carbon-carbon double bonds in the sense of the present invention do not include those which formally are part of an aromatic ring. Thus, for example, the three carbon-carbon double bonds contained formally within a benzene ring remain unregarded for calculation of the theoretical carbon-carbon double bond content. The theoretical carbon-carbon double bond content, referred to as double bond content in the formula set out below, is calculated as follows:

$$\text{Double bond content} = \frac{\text{amount of substance(double bonds)}}{\text{mass(oligoester)}}.$$

In this formula, the expression "amount of substance (double bonds)" denotes the amount of substance of the carbon-carbon double bonds, with mmol as the unit, and the expression "mass(oligoester)" denotes the mass of the alpha,omega-hydroxy-functionalized oligoester, with gram as the unit.

The mass of the alpha,omega-hydroxy-functionalized oligoester is the sum of masses of the monomers used in its preparation, minus the mass of the water formed in the course of its preparation, assuming complete conversion of all of the anhydride and/or carboxylic acid groups. The amount of substance of the carbon-carbon double bonds is a product of the amount of substance of the unsaturated monomers used. Where, for example, exclusively monounsaturated monomers are used, such as maleic anhydride, for example, the amount of substance of the carbon-carbon double bonds is equal to the amount of substance of the unsaturated monomers used. Where, for example, diunsaturated monomers are used, the amount of substance of the carbon-carbon double bonds introduced by such monomers into the alpha,omega-hydroxy-functionalized oligoester is twice the amount of substance used of the corresponding diunsaturated monomer.

The at least one acid group of the alpha,omega-hydroxy-functionalized oligoester for use in accordance with the invention is preferably a carboxylic acid group ($—CO_2H$), a sulfonic acid group ($—SO_3H$), a phosphoric monoester ($—O—P(O)(OH)_2$), a phosphoric diester of the general formula

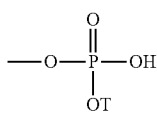

where T is an aliphatic or aromatic radical, or monosubstituted sulfates (—OSO$_3$H). With particular preference it is a carboxylic acid or sulfonic acid group. With very particular preference the groups in question are carboxylic acid groups.

The alpha,omega-hydroxy-functionalized oligoester for use in accordance with the invention contains on average at least one acid group. Said alpha,omega-hydroxy-functionalized oligoester preferably contains on average 1 to 3, more preferably 1 to 2 and very preferably precisely one acid group.

It is further preferred that the said acid groups are not to be located at a terminal position in the alpha,omega-hydroxy-functionalized oligoester for use in accordance with the invention. This means that the monomer via which the acid groups are introduced into the alpha,omega-hydroxy-functionalized oligoester is not a terminal monomer unit within said alpha,omega-hydroxy-functionalized oligoester.

The alpha,omega-hydroxy-functionalized oligoester for use in accordance with the invention may in principle contain different acid groups. This is possible, for example, by use of monomers having different acid groups in the preparation of said oligoester. Depending on the molar mass of the respective alpha,omega-hydroxy-functionalized oligoester species, it is possible for different acid groups to be present in an alpha,omega-hydroxy-functionalized oligoester species. It is also conceivable, however, for a first alpha,omega-hydroxy-functionalized oligoester species to bear one acid group, while a second bears an acid group which is different from the acid group of the first alpha,omega-hydroxy-functionalized oligoester species. The alpha,omega-hydroxy-functionalized oligoester for use in accordance with the invention, however, preferably comprises precisely one kind of acid groups; in other words, each alpha,omega-hydroxy-functionalized oligoester species, irrespective of whether it now bears one or more acid groups, possesses the same kind of acid groups.

Relative to one gram of the alpha,omega-hydroxy-functionalized oligoester for use in accordance with the invention, it contains preferably 0.1 to 1.2 mmol, more preferably 0.2 to 1.0 mmol and very preferably 0.5 to 0.8 mmol of acid groups.

Where said acid group is a sulfonic acid group or a monosubstituted sulfate, the amount of substance of the acid groups present in the alpha,omega-hydroxy-functionalized oligoester is determined by means of 1H NMR. Here, d6-DMSO is used as deuterated solvent, and tetramethylsilane as standard.

Where said acid group is a phosphoric monoester or a phosphoric diester, the amount of acid groups present in the alpha,omega-hydroxy-functionalized oligoester is determined by means of 31P NMR. d6-DMSO is used as deuterated solvent, and triphenyl phosphite as standard.

Where said acid group is a carboxylic acid group, the amount of substance of the carboxylic group present in the alpha,omega-hydroxy-functionalized oligoester can be indicated using the acid number. The acid number is preferably in the range from 5 to 70 mg KOH/g, more preferably 10 to 60 mg KOH/g and very particularly preferably 30 to 50 mg KOH/g. The acid number is determined in accordance with DIN 53402. In this determination, the free acids present in the sample are titrated with a potassium hydroxide standard solution in the presence of a color indicator. The acid number corresponds to the mass of potassium hydroxide, in mg, which is needed to neutralize 1 g of the alpha,omega-hydroxy-functionalized oligoester under specified conditions.

In one preferred embodiment, the alpha,omega-hydroxy-functionalized oligoester is preparable by reacting
(i) at least one alpha,omega-hydroxy-functionalized oligoester (I) which possesses an OH number of 30 to 170 mg KOH/g, a theoretical carbon-carbon double bond content of 1 to 2.5 mmol/g, a number-average molecular weight of 800 to 2200 g/mol and a mass-weighted molecular weight of 1000 to 6000 g/mol,
(ii) with at least one cyclic dicarboxylic anhydride of the structural formula (I)

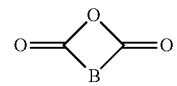

where B is an aliphatic or aromatic radical which contains at least one acid group,
with the proviso that the carboxylic acid groups resulting from the opening of the dicarboxylic anhydride group of the cyclic dicarboxylic anhydride of the structural formula (I) are reacted completely with the alpha,omega-hydroxy-functionalized oligoester (I), to form an ester bond in each case, and
(iii) the at least one acid group is partially or completely salified.

The complete reaction referred to above means more particularly that more than 95 mol %, preferably more than 99 mol % and more preferably more than 99.5 mol % of the carboxylic acid groups formally present in the anhydride groups have reacted to form in each case an ester bond.

What is meant by partial and complete salification, respectively, has already been discussed above in connection with the general description of the alpha,omega-hydroxy-functionalized oligoester for use in accordance with the invention.

The at least one acid group is preferably a carboxylic acid group, a sulfonic acid group, a phosphoric monoester, a phosphoric diester, or monosubstituted sulfates. Preferably it is a carboxylic acid or sulfonic acid group. Very preferably it is a carboxylic acid group.

Description of the Alpha,Omega-Hydroxy-Functionalized Oligoester (I)

The term "alpha,omega-hydroxy-functionalized oligoester (I)" denotes an oligoester with a hydroxyl group located at each of its opposite ends, identified by alpha and omega respectively. This means that an oligoester of this kind is terminated at both ends by one monomer unit in each case that in each case bears precisely one hydroxyl group. Where the oligoester is branched, alpha and omega denote the ends of the longest polymer chain in the monomer. The length here is measured by the number of monomers incorporated. The possession by said alpha,omega-hydroxy-functionalized oligoester (I) of further hydroxyl groups is not ruled out, moreover. It is preferred in principle for the alpha,omega-hydroxy-functionalized oligoester (I) for use in accordance with the invention to possess precisely two hydroxyl groups—that is, one each in the alpha and omega positions. It is particularly preferred for the alpha,omega-hydroxy-functionalized oligoester (I) for use in accordance with the invention to possess precisely two hydroxyl groups, one in the alpha-position and one in the omega-position, and, furthermore, to be linear.

It is again made clear that the alpha,omega-hydroxy-functionalized oligoester (I) is different from the alpha, omega-hydroxy-functionalized oligoester for use in accordance with the invention. As already elucidated above, the alpha,omega-hydroxy-functionalized oligoester (I) constitutes a preferred reactant in the preparation of the alpha, omega-hydroxy-functionalized oligoester for use in accordance with the invention.

The alpha,omega-hydroxy-functionalized oligoester (I) possesses preferably an OH number of 70 to 160 mg KOH/g and more preferably of 130 to 160 mg KOH/g and also an acid number of preferably 0 to 10 mg KOH/g, more preferably 0 to 5 mg KOH/g and very preferably 0 to 2 mg KOH/g. The OH number and the acid number are determined as already described and in accordance with DIN 53240 and DIN 53402.

The alpha,omega-hydroxy-functionalized oligoester (I) further possesses a preferred theoretical carbon-carbon double bond content of 1.5 to 2 mmol/g and very preferably of 1.6 to 1.9 mmol/g. What is meant by a theoretical carbon-carbon double bond content and how it is to be calculated has already been described earlier on above in connection with the alpha,omega-hydroxy-functionalized oligoester.

The alpha,omega-hydroxy-functionalized oligoester (I) further possesses a preferred number-average molecular weight of 1000 to 2000 g/mol and more preferably of 1200 to 1800 g/mol and also a weight-average molecular weight of preferably 2000 to 5000 g/mol and more preferably 2800 to 4000 g/mol. The number-average and weight-average molecular weights are determined by means of gel permeation chromatography with tetrahydrofuran as eluent and with use of a polystyrene standard. The column material consist of styrene-divinylbenzene copolymers.

The alpha,omega-hydroxy-functionalized oligoester (I) may be prepared, for example, from the reaction of polycarboxylic acids with polyols. It is preferably prepared from the reaction of dicarboxylic acids and also their anhydrides and diols, triols and monohydroxy-functional compounds. Diols are used with preference.

Where the alpha,omega-hydroxy-functionalized oligoester (I) is prepared with dicarboxylic acids, it is also possible in principle to use their anhydrides. In the text below, therefore, the term "dicarboxylic acid" should be understood so as likewise to include the corresponding anhydride. It is part of the general knowledge of a person of ordinary skill in the art to decide to use the compounds in question either in dicarboxylic acid form or in anhydride form.

It should also be pointed out that the dicarboxylic acids and their anhydrides that are identified here do not contain any other acid groups of the kind specified above, i.e. carboxylic acid groups, sulfonic acid groups, phosphoric monoesters, phosphoric diesters or monosubstituted sulfates. In every case, therefore, they are different from the cyclic dicarboxylic anhydride of the structural formula (I).

Dicarboxylic Acids

The dicarboxylic acids for use in accordance with the invention may be aromatic or aliphatic compounds. In the case of aliphatic compounds, those in question contain no aromatic groups, such as a benzene radical, for example. An aromatic compound in the sense of the present invention comprehends all those compounds which contain at least one aromatic group, such as a benzene radical, for example.

As an example of an aromatic compound, mention may be made, for example, of the constitutional isomers of benzenedicarboxylic acid, which are known to the skilled person, and also of terephthalic anhydride.

Aliphatic dicarboxylic acids are preferred. With particular preference said aliphatic dicarboxylic acids are saturated or singly or plurally unsaturated. With very particular preference they are linear aliphatic dicarboxylic acids which are either saturated or singly or plurally unsaturated. In addition it is also possible to use cycloaliphatic dicarboxylic acids.

It is further preferred for at least one saturated and at least one singly or plurally unsaturated aliphatic dicarboxylic acid to be used.

Particular preference is given to using to at least one saturated linear aliphatic dicarboxylic acid and at least one singly or plurally unsaturated linear aliphatic dicarboxylic acid.

Particular preference is given to using precisely one saturated and precisely one singly or plurally unsaturated aliphatic dicarboxylic acid. With very particular preference precisely one saturated linear and precisely one singly or plurally unsaturated linear aliphatic dicarboxylic acid are used.

The molar ratio of saturated to singly and/or plurally unsaturated aliphatic dicarboxylic acids is preferably 0.5:1.5 to 1.5:0.5, more preferably 0.75:1.25 to 1.25:0.75 and very preferably 0.9:1.1 to 1.1:0.9. The stated ratios apply both to the case where more than saturated and/or more than one unsaturated dicarboxylic acid are used, and to the case where precisely one saturated and precisely one unsaturated dicarboxylic acid are used.

Saturated aliphatic dicarboxylic acids used are preferably those having 4 to 18, more preferably 6 to and very preferably 6 to 10 carbon atoms. With particular preference these are linear saturated aliphatic dicarboxylic acids.

Singly unsaturated aliphatic dicarboxylic acids used are preferably those having 4 to 10, more preferably 4 to 8 and very preferably 4 to 6 carbon atoms. With particular preference they are corresponding unsaturated linear aliphatic dicarboxylic acids. Plurally unsaturated aliphatic dicarboxylic acids used are preferably those having 6 to 18, more preferably 8 to 16 and very preferably 10 to 14 carbon atoms. With particular preference they are corresponding unsaturated linear aliphatic dicarboxylic acids.

The saturated aliphatic dicarboxylic acids are, for example, alkanedioic acids. Preference is given to using saturated alkanedioic acids which contain 4 to 18, more preferably 6 to 14 and very preferably 6 to 10 carbon atoms. These are preferably corresponding saturated linear alkanedioic acids. Suitable alkanedioic acids are, for example, succinic acid, glutaric acid, adipic acid, pimelic acid, suberic acid, azelaic acid, sebacic acid, undecanedioic acid, dodecanedioic acid, tridecanedioic acid, tetradecanedioic acid and hexadecanedioic acid, and also their anhydrides, where they exist.

As singly unsaturated aliphatic dicarboxylic acids it is possible to use alkenedioic acids which contain 4 to 10, more preferably 4 to 8 and very preferably 4 to 6 carbon atoms. An example of suitable singly unsaturated linear alkenedioic acids is maleic acid.

Diols

The diols preferably to be used may be aromatic or aliphatic compounds. Aliphatic diols are preferred. With particular preference these are linear or cyclic aliphatic diols. They may be either saturated or else singly or plurally unsaturated. Preference is given to saturated linear or saturated cycloaliphatic diols.

It is possible for example to use saturated aliphatic diols having 4 to 18, more preferably 6 to 14 and very preferably 6 to 10 carbon atoms. Preferably these are corresponding saturated linear or saturated cycloaliphatic diols.

Preference is given to using saturated alkanediols or saturated cycloakanediols. The latter may be monocycloalkanediols, bicycloalkanediols or tricycloalkanediols.

Use may be made, for example, of saturated alkanediols having 4 to 18, more preferably 6 to 14 and very preferably 6 to 10 carbon atoms. Preferably these are corresponding saturated linear alkanediols. Suitable saturated alkanediols are 1,4-butanediol and 1,6-hexanediol, for example.

Use may also be made, for example, of saturated cyclic aliphatic diols having 6 to 18, more preferably 6 to 14 and very preferably 6 to 10 carbon atoms.

It is possible with preference to use saturated cycloalkanediols having 6 to 18, more preferably 6 to 14 and very preferably 6 to 10 carbon atoms. Saturated cycloalkanediols which can be used with very particular preference are tricyclodecanediol, cyclohexyldimethanol and tetramethylcyclobutanediol.

It is further preferred for at least one linear aliphatic diol to be used. It is likewise preferred for at least one linear aliphatic diol and at least one cyclic aliphatic diol to be used. The molar ratio between the linear aliphatic and the cyclic aliphatic diols is then preferably 0.5:1.5 to 1.5:0.5, more preferably 0.75:1.25 to 1.25:0.75 and very preferably 0.9:1.1 to 1.1:0.9.

The alpha,omega-hydroxy-functionalized oligoester (I) is prepared using an excess of diols. The molar ratio of dicarboxylic acids to diols is then for example n:(n+1.1) to n:(n+2), preferably n:(n+1.2) to n:(n+1.8), more preferably n:(n+1.3) to n:(n+1.6) and very preferably n:(n+1.3) to n:(n+1.5), where n denotes the amount of substance of the dicarboxylic acid.

The alpha,omega-hydroxy-functionalized oligoester (I) is prepared in a manner familiar to the skilled person. In order to achieve quantitative conversion of the reactants used, it is necessary for the water formed during the reaction to be removed from the chemical equilibrium. This is accomplished principally through the use of a water separator. The alpha,omega-hydroxy-functionalized oligoester (I) is, accordingly, a polycondensation product. The alpha,omega-hydroxy-functionalized oligoester (I) therefore comprises a mixture of corresponding oligoesters with different chain lengths. Where an excess of diol is used, said mixture necessarily includes unreacted diol as well.

In one preferred embodiment of the alpha,omega-hydroxy-functionalized oligoester for use in accordance with the invention it is prepared using at least one saturated linear aliphatic dicarboxylic acid, at least one singly unsaturated linear aliphatic dicarboxylic acid and at least one saturated aliphatic diol. In another embodiment, likewise preferred, of the alpha,omega-hydroxy-functionalized oligoester for use in accordance with the invention, it is prepared using at least one saturated linear aliphatic dicarboxylic acid, at least one saturated cycloaliphatic dicarboxylic acid, at least one singly unsaturated linear aliphatic dicarboxylic acid and at least one saturated aliphatic diol. The saturated linear aliphatic dicarboxylic acid to be used is preferably a linear alkanedioic acid having 4 to 18, more preferably 6 to 14 and very preferably 6 to 10 carbon atoms. The singly unsaturated linear dicarboxylic acid is preferably a singly unsaturated linear alkenedioic acid having 4 to 10, more preferably 4 to 8 and very preferably 4 to 6 carbon atoms. The saturated aliphatic diol preferably comprises saturated linear alkanediols having 4 to 18, more preferably 6 to 14 and very preferably 6 to 10 carbon atoms. The saturated cycloaliphatic diol preferably comprises saturated cycloalkanediols having 6 to 18, more preferably 6 to and very preferably 6 to 10 carbon atoms. With regard to the two preferred embodiments, furthermore, the above-indicated molar ratios of saturated to singly and/or plurally unsaturated aliphatic dicarboxylic acids are preferred, more preferred and very preferred. The same applies with respect to the above-indicated molar ratios between the linear aliphatic diol and cycloaliphatic diol.

Furthermore, when preparing the alpha,omega-hydroxy-functionalized oligoester (I), it is of course also possible to use triols and monohydroxy-functional compounds. For example, aliphatic triols and also aliphatic monohydroxy-functional compounds may be used. The compounds in question are preferably corresponding aliphatic hydrocarbon compounds.

An example of a triol is trimethylolpropane. As monohydroxy-functional compounds, for example, dodecanol can be used.

For preparing the alpha,omega-hydroxy-functionalized oligoester for use in accordance with the invention in the preferred embodiment designated above, at least one alpha,omega-hydroxy-functionalized oligoester (I) is reacted with at least one cyclic dicarboxylic anhydride of the structural formula (I)

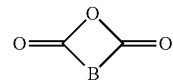

where B is an aliphatic, cycloaliphatic or aromatic radical which contains at least one acid group. This acid group is preferably selected from the group already disclosed above in connection with the general description of the alpha,omega-hydroxy-functionalized oligoester, consisting of carboxylic acid, sulfonic acid, phosphoric monoester, phosphoric diester or monosubstituted sulfate. In the cyclic dicarboxylic anhydride of the structural formula (I), the two carboxylic acid groups from which the anhydride was formed are located preferably each in alpha-position to one another. This may be illustrated using the following structural formula:

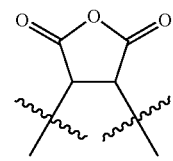 [SMILES: *C1C(=O)OC(=O)C1*]

More preferably B is an aromatic radical, and very preferably a benzene radical. It is likewise preferred for B to contain only precisely one acid group. In that case the group is preferably a carboxylic acid group or a sulfonic acid group. As cyclic dicarboxylic anhydride of the structural formula (I) it is preferred to use trimellitic anhydride or sulfoisophthalic anhydride.

Based on the total amount of substance of the polycarboxylic acids, polyols and said at least one cyclic dicarboxylic anhydride of the structural formula (I), to be used in preparing the alpha,omega-hydroxy-functionalized oligoester for use in accordance with the invention, it is preferred to use 2 to 10 mol %, more preferably 3 to 9 mol % and very preferably 4 to 7 mol % of said cyclic dicarboxylic anhydride of the structural formula (I).

The alpha,omega-hydroxy-functionalized oligoester (I) may be reacted as already described above, in a further reaction step, to give the alpha,omega-hydroxy-functionalized oligoester for use in accordance with the invention. The reaction conditions are selected such that the two carboxylic acid groups formally present in the anhydride group of the cyclic dicarboxylic anhydride of the structural formula (I) are reacted completely with the alpha,omega-hydroxy-functionalized oligoester (I), to form one ester bond in each case. Moreover, there is no esterification of the at least one acid group of the radical B with the alpha,omega-hydroxy-functionalized oligoester (I). This means that less than 5 mol %, preferably less than 1 mol %, more preferably less than 0.5 mol % and very preferably less than 0.1 mol % of said acid groups are esterified. Accordingly, for example, the reaction temperature ought not to exceed 160° C., since otherwise even the less reactive acid groups of the radical B would be reacted quantitatively with the hydroxyl groups of the alpha,omega-hydroxy-functionalized oligoester (I).

In a further preferred embodiment, the alpha,omega-hydroxy-functionalized oligoester possesses the structural formula (II):

pletely salified with precisely one equivalent of DMAE. If the number-average molecular weight is 3600 g/mol, for example, then m+n is on average between 14 and 15.

The number-average molecular weight of the alpha,omega-hydroxy-functionalized oligoester of the structural formula (II) is situated preferably in the range from 3200 to 5000 g/mol and very preferably in the range from 3500 to 4500 g/mol. Furthermore, the weight-average molecular weight of the alpha,omega-hydroxy-functionalized oligoester of the structural formula (II) is situated preferably in the range from 15 000 to 28 000 g/mol and more preferably in the range from 20 000 to 26 000.

The alpha,omega-hydroxy-functionalized oligoester of the structural formula (II) possesses preferably an OH number of 35 to 85 mg KOH/g and very preferably of 45 to 65 mg KOH/g.

Furthermore, the alpha,omega-hydroxy-functionalized oligoester of the structural formula (II) possesses preferably a theoretical carbon-carbon double bond content of 1 to 2 mmol/g and very preferably of 1.2 to 1.8 mmol/g.

In one preferred embodiment of the alpha,omega-hydroxy-functionalized oligoester of the structural formula (II), either m or n is 0.

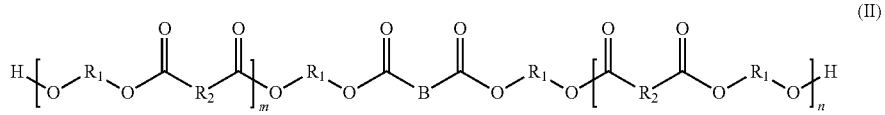

(II)

where
the (m+n+2) radicals $R_1$ independently of one another are selected from the group of linear or cyclic alkylene radicals,
the (m+n) radicals $R_2$ independently of one another are selected from the group of alkylene or alkenylene radicals, the ratio of alkylene to alkenylene radicals being just selected such that said alpha,omega-hydroxy-functionalized oligoester of the structural formula (II) possesses a theoretical carbon-carbon double bond content of 0.5 to 2.5 mmol/g,
the indices m and n are selected such that the number-average molecular weight of said alpha,omega-hydroxy-functionalized oligoester of the structural formula (II) is 2500 to 6000 g/mol, and
the radical B is an aliphatic or aromatic radical which contains at least one acid group which is partially or completely salified.

What is meant by partial and complete salification, respectively, has already been discussed above in connection with the general description of the alpha,omega-hydroxy-functionalized oligoester for use in accordance with the invention.

The indices m and n are each an integer, which can also be zero. The prerequisite that the indices m and n are selected such that the number-average molecular weight of said alpha,omega-hydroxy-functionalized oligoester of the structural formula (II) is 2500 to 6000 g/mol is explained hereinafter. It shall be assumed that all (m+n+2) radicals $R_1$ are a hexamethylene radical, and half of all (m+n) radicals $R_2$ are each a tetramethylene radical and the other half are each a radical of the formula —CH=CH—. Further, it is assumed that A is a benzene radical containing a carboxylic acid in position 4. Moreover, all carboxylic acids are com- Alpha,omega-hydroxy-functionalized oligoester of the structural formula (II) preferably contains precisely one acid group. In this case, accordingly, K=1.

$R_1$ is a linear or cyclic alkylene radical. In the case of a linear alkylene radical, it contains for example 4 to 18, more preferably 6 to 14 and very preferably 6 to 10 carbon atoms. With very particular preference it is presently a hexamethylene radical. In the case of a cyclic alkylene radical, it contains for example 6 to 18, more preferably 6 to 14 and very preferably 6 to 10 carbon atoms. With very particular preference it is presently a tricyclodecane radical.

In the alpha,omega-hydroxy-functionalized oligoester of the structural formula (II) there may be precisely one kind of radicals $R_1$ present, in other words either linear or cyclic alkylene radicals. It is likewise preferred for precisely two kinds of radicals $R_1$ to be present—that is, linear alkylene radicals and cyclic alkylene radicals. The molar ratio between the linear and the cyclic alkylene radicals in that case is preferably 0.5:1.5 to 1.5:0.5, more preferably 0.75:1.25 to 1.25:0.75 and very preferably 0.9:1.1 to 1.1:0.9.

Where there is more than one kind of radicals $R_1$ present in the alpha,omega-hydroxy-functionalized oligoester of the structural formula (II), their arrangement in the oligomer is random.

$R_2$ is either an alkylene or an alkenylene radical. It is preferred here for the molar ratio between alkylene and alkenylene radicals to be 0.5:1.5 to 1.5:0.5, more preferably 0.75:1.25 to 1.25:0.75 and very preferably 0.9:1.1 to 1.1:0.9.

If $R_2$ is an alkylene radical, it is preferably linear and contains preferably 2 to 16, more preferably 4 to and very preferably 4 to 8 carbon atoms. Likewise with very particular preference it is a tetramethylene radical.

$R_2$ may also be an alkenylene radical. In the case of a singly unsaturated alkenylene radical, it is preferably linear and contains 2 to 8, more preferably 2 to 6 and very preferably 2 to 4 carbon atoms. With very particular preference it is an alkenylene radical of the structure —CH═CH—.

If there is more than one kind of radicals $R_2$ present in the alpha,omega-hydroxy-functionalized oligoester of the structural formula (II), their arrangement in the oligomer is random.

The radical B in the alpha,omega-hydroxy-functionalized oligoester of the structural formula (II) is preferably a radical $A(Q)_K$, where
A is an aliphatic or aromatic radical,
the radical Q is a partially or completely salified acid group, and
K=1 to 3.

Q is preferably a partly or completely salified carboxylic acid or sulfonic acid. Likewise preferably, A is an alkylene radical, a cyclic alkylene radical or an aromatic radical.

More preferably A is a benzene radical in which the two carboxylic ester groups are located in each case in alpha-position to one another, and also K=1. More preferably Q, furthermore, is a partially or completely salified carboxylic acid group. What is meant by the fact that the two carboxylic ester groups are each located in alpha-position to one another is illustrated in the structural formula below:

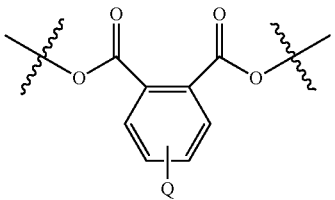

Particularly preferred embodiments of the alpha,omega-hydroxy-functionalized oligoester for use in accordance with the invention of the structural formula (II) are specified below:

a) In one particularly preferred embodiment of the alpha, omega-hydroxy-functionalized oligoester of the structural formula (II) it possesses a number-average molecular weight of 3500 to 4500 g/mol.

b) In another particularly preferred embodiment of the alpha,omega-hydroxy-functionalized oligoester of the structural formula (II) it possesses a weight-average molecular weight of 20 000 to 26 000 g/mol.

c) In another particularly preferred embodiment of the alpha,omega-hydroxy-functionalized oligoester of the structural formula (II) it possesses an OH number of 45 to 65 mg KOH/g.

d) In another particularly preferred embodiment of the alpha,omega-hydroxy-functionalized oligoester of the structural formula (II) it possesses a theoretical carbon-carbon double bond content of 1 to 2 mmol/g.

e) In another particularly preferred embodiment of the alpha,omega-hydroxy-functionalized oligoester of the structural formula (II), the (m+n) radicals $R_2$ are selected from the group of linear alkylene radicals having 4 to 8 carbon atoms and from the group of linear alkenylene radicals having 2 to 4 carbon atoms. Very preferably in this case the molar ratio between the linear alkylene radicals and the linear alkenylene radicals is 0.9:1.1 to 1.1:0.9.

f) In another particularly preferred embodiment of the alpha,omega-hydroxy-functionalized oligoester of the structural formula (II), the (m+n+2) radicals $R_1$ are selected from the group of linear alkylene radicals having 6 to 10 carbon atoms. It is likewise possible for the (m+n+2) radicals $R_1$ to be selected from the group of linear alkylene radicals having 6 to 10 carbon atoms and also from the group of cyclic alkylene radicals having 6 to 10 carbon atoms. Very preferably in this case the molar ratio between linear and cyclic alkylene radicals is 0.9:1.1 to 1.1:0.9 g) In another particularly preferred embodiment of the alpha,omega-hydroxy-functionalized oligoester of the structural formula (II), the radical B is a radical $A(Q)_K$ as defined above, where A is a benzene radical in which the two carboxylic ester groups are each located in alpha-position to one another, and also K=1.

In one very preferred embodiment of the alpha,omega-hydroxy-functionalized oligoester of the structural formula (II), all of the features indicated under a) to g) are realized in combination.

When preparing the alpha,omega-hydroxy-functionalized oligoester (I) it is preferred to use an excess of diol, and so the reaction mixture also includes reacted diol. When reacting the alpha,omega-hydroxy-functionalized oligoester (I) with a suitable cyclic dicarboxylic anhydride, therefore, essentially three different kinds of products are formed.

Product 1:
alpha,omega-hydroxy-functionalized oligoester of the structural formula (II) where both m and n are greater than zero.

Product 2:
alpha,omega-hydroxy-functionalized oligoester of the structural formula (II) where either m or n is zero. The other variable in each case adopts a value greater than zero.

Product 3:
alpha,omega-hydroxy-functionalized oligoester of the structural formula (II) where m and n are both zero.

The reaction mixture contains preferably at least 60%, more preferably at least 70% and very preferably at least 80% of the product 2, the percentage figures being based on the total amount of substance of products 1 to 3.

Pigmented Aqueous Basecoat

It is essential to the invention that the pigmented aqueous basecoat material of the invention comprises the above-described alpha,omega-hydroxy-functionalized oligoester for use in accordance with the invention in an amount of 0.5 to 10 wt %, based on the total solids fraction of the pigmented aqueous basecoat material. The alpha,omega-hydroxy-functionalized oligoester for use in accordance with the invention is used preferably in an amount of 1 to 9 wt %, more preferably 1 to 8 wt % and very preferably 1.5 to 7.5 wt %. If the amount is below the lower limit of 0.5 wt %, then the adhesion will not be improved. If the amount is above the upper limit of 10 wt %, then disadvantages such as yellowing in the resultant coating, for example, will occur.

In the pigmented aqueous basecoat material of the invention, the sum of the weight percentage fractions of all the alpha,omega-hydroxy-functionalized oligoesters is 0.5 to 10 wt %, based on the total solids fraction of the pigmented aqueous basecoat material. If preferred embodiments of said alpha,omega-hydroxy-functionalized oligoester are used, the sum of the weight percentage fractions of all the preferred embodiments of said alpha,omega-hydroxy-functionalized oligoester is preferably likewise 0.5 to 10 wt %, based on the total solids fraction of the pigmented aqueous basecoat material. With particular preference the only alpha,omega-hydroxy-functionalized oligoester present in the pigmented aqueous basecoat material of the invention is preferred embodiments of said alpha,omega-hydroxy-functionalized oligoesters.

In one preferred embodiment of the pigmented aqueous basecoat material of the invention, the sum of the weight percentage fractions of all the alpha,omega-hydroxy-functionalized oligoesters is 1 to 9 wt %, based on the total solids fraction of the pigmented aqueous basecoat material. If preferred embodiments of said alpha,omega-hydroxy-functionalized oligoesters are used, the sum of the weight percentage fractions of all the preferred embodiments of said alpha,omega-hydroxy-functionalized oligoester is preferably likewise 1 to 9 wt %, based on the total solids fraction of the pigmented aqueous basecoat material. With particular preference the only alpha,omega-hydroxy-functionalized oligoester present in the pigmented aqueous basecoat material of the invention is preferred embodiments of said alpha,omega-hydroxy-functionalized oligoesters. In one particularly preferred embodiment of the pigmented aqueous basecoat material of the invention, the sum of the weight percentage fractions of all the alpha,omega-hydroxy-functionalized oligoesters is 1 to 8 wt %, based on the total solids fraction of the pigmented aqueous basecoat material. If preferred embodiments of said alpha,omega-hydroxy-functionalized oligoesters are used, the sum of the weight percentage fractions of all the preferred embodiments of said alpha,omega-hydroxy-functionalized oligoester is preferably likewise 1 to 8 wt %, based on the total solids fraction of the pigmented aqueous basecoat material. With particular preference the only alpha,omega-hydroxy-functionalized oligoester present in the pigmented aqueous basecoat material of the invention is preferred embodiments of said alpha,omega-hydroxy-functionalized oligoesters.

In one very particularly preferred embodiment of the pigmented aqueous basecoat material of the invention, the sum of the weight percentage fractions of all the alpha,omega-hydroxy-functionalized oligoesters is 1.5 to 7.5 wt %, based on the total solids fraction of the pigmented aqueous basecoat material. If preferred embodiments of said alpha,omega-hydroxy-functionalized oligoesters are used, the sum of the weight percentage fractions of all the preferred embodiments of said alpha,omega-hydroxy-functionalized oligoester is preferably likewise 1.5 to 7.5 wt %, based on the total solids fraction of the pigmented aqueous basecoat material. With particular preference the only alpha,omega-hydroxy-functionalized oligoester present in the pigmented aqueous basecoat material of the invention is preferred embodiments of said alpha,omega-hydroxy-functionalized oligoesters.

An example of embodiments of the alpha,omega-hydroxy-functionalized oligoester that are preferred in this sense is the alpha,omega-hydroxy-functionalized oligoester of structural formula (II).

As further examples of embodiments of the alpha,omega-hydroxy-functionalized oligoester of the invention that are preferred in this sense, mention may be made of the following particularly preferred embodiments:

a) In one particularly preferred embodiment of the alpha,omega-hydroxy-functionalized oligoester of the structural formula (II) it possesses a number-average molecular weight of 3500 to 4500 g/mol.

b) In another particularly preferred embodiment of the alpha,omega-hydroxy-functionalized oligoester of the structural formula (II) it possesses a weight-average molecular weight of 20 000 to 26 000 g/mol.

c) In another particularly preferred embodiment of the alpha,omega-hydroxy-functionalized oligoester of the structural formula (II) it possesses an OH number of 45 to 65 mg KOH/g.

d) In another particularly preferred embodiment of the alpha,omega-hydroxy-functionalized oligoester of the structural formula (II) it possesses a theoretical carbon-carbon double bond content of 1 to 2 mmol/g.

e) In another particularly preferred embodiment of the alpha,omega-hydroxy-functionalized oligoester of the structural formula (II), the (m+n) radicals $R_2$ are selected from the group of linear alkylene radicals having 4 to 8 carbon atoms and from the group of linear alkenylene radicals having 2 to 4 carbon atoms. Very preferably in this case the molar ratio between the linear alkylene radicals and the linear alkenylene radicals is 0.9:1.1 to 1.1:0.9.

f) In another particularly preferred embodiment of the alpha,omega-hydroxy-functionalized oligoester of the structural formula (II), the (m+n+2) radicals $R_1$ are selected from the group of linear alkylene radicals having 6 to 10 carbon atoms. It is likewise possible for the (m+n+2) radicals $R_1$ to be selected from the group of linear alkylene radicals having 6 to 10 carbon atoms and also from the group of cyclic alkylene radicals having 6 to 10 carbon atoms. Very preferably in this case the molar ratio between linear and cyclic alkylene radicals is 0.9:1.1 to 1.1:0.9 g) In another particularly preferred embodiment of the alpha,omega-hydroxy-functionalized oligoester of the structural formula (II), the radical B is a radical $A(Q)_K$ as defined above, where A is a benzene radical in which the two carboxylic ester groups are each located in alpha-position to one another, and also K=1.

An embodiment of the alpha,omega-hydroxy-functionalized oligoester that is likewise preferred in this sense is that which realizes all of the features specified under a) to g), in combination.

The solids content or total solids fraction of the pigmented aqueous basecoat material may be determined by weighing out approximately 2 g of sample into a pre-dried aluminum dish and drying it in a drying cabinet at 125° C. for 60 minutes, cooling it in a desiccator, and then reweighing it. The residue, relative to the total amount of sample used, corresponds to the solids fraction. The solids was determined in accordance with EN ISO 3251 (1-2 g 1 h 125° C.)

The pigmented aqueous basecoat material comprises at least one organic polymer as binder. These organic polymers are, for example, the polyurethane resins, polyester resins and/or epoxy resins that are known to the skilled person. Likewise possible is the use of conventional polyacrylate resins and polymethacrylate resins (referred to hereinafter as poly(meth)acrylate resins). The stated organic polymers as binders preferably additionally contain different functional groups for chemical crosslinking, with hydroxyl groups being preferred. As binders it is preferred to use polyurethane resins, polyester resins and/or poly(meth)acrylate resins, preferably containing hydroxyl groups. Organic polymers and resins of these kinds are described for example in Römpp-Lexikon Lacke and Druckfarben, Georg Thieme Verlag, Stuttgart, N.Y., 1998, pages 73 to 74. The dispersibility of the organic polymers or resins in water can be achieved via the measures familiar to the skilled person.

This may involve the ionic modification of the organic polymers through introduction of monomers which contain carboxylate groups or sulfonate groups, for example. Also possible is nonionic modification through polyglycol ether chains, for example, or the use of particular additives, described later on below, such as dispersants, for example emulsifiers.

The organic polymers may be physically curing or chemically curing—that is, chemically crosslinking. In the latter case, the organic polymers may be self-crosslinking and/or externally crosslinking. This means that the complementary functional groups, which under curing conditions, heat for example, react and so form a crosslinked coating film, may be present in one and the same organic polymer (self-crosslinking). It is also possible, however, for the complementary functional groups to be present in different compounds (external crosslinking).

In the case of externally crosslinking systems, for example, as well as the resin systems cited above, there are additionally fully etherified and/or partly etherified amino resins, monomeric and/or polymeric polyamines and also monomeric and/or polymeric blocked and/or free polyisocyanates present as crosslinkers in the aqueous coating composition. For the purposes of the present invention, it is preferred to use fully etherified and/or partly etherified amino resins, more preferably fully etherified and/or partly etherified melamine-formaldehyde resins.

The selection and combination of suitable organic polymers and monomers, for example of suitable polyurethane resins, polyester resins, poly(meth)acrylate resins and/or epoxy resins with suitable functional groups, preferably hydroxyl groups, and optionally amino resins, polyamines and/or polyisocyanates, are made in accordance with the desired and/or required properties of the coating system under production. A further criterion for selection are the desired and/or necessary curing conditions, more particularly the curing temperatures. The way in which such a selection is to be made is something which the person skilled in the field of painting technology is aware of and is able to adapt accordingly. Possibilities here include the conventional one-component and also two-component coating systems (in this regard see also Römpp-Lexikon Lacke and Druckfarben, Georg Thieme Verlag, Stuttgart, N.Y., 1998, pages 274-276 and pages 641-642). Preference is given to use of one-component systems. Particularly preferred in the context of the present invention is the use of a combination of at least one hydroxy-functional polyurethane, polyester and/or poly(meth)acrylate resin as binder and at least one fully and/or partly etherified melamine-formaldehyde resin as crosslinker.

The fraction of all the film-forming components, more particularly of the at least one hydroxy-functional polyurethane, polyester and/or poly(meth)acrylate resin as binder and of the at least one fully and/or partly etherified melamine-formaldehyde resin as crosslinker, is advantageously in the range from 10 to 90 wt %, more particularly from 15 to 60 wt %, more preferably in the range from 20 to 50 wt %, based in each case on the total amount of the pigmented aqueous basecoat material. The fraction of any separately considered resin as binder and also of a crosslinker is advantageously not below 3 wt %, based on the total amount of the aqueous coating composition.

The pigmented aqueous basecoat material further comprises at least one customary and known, color-imparting and/or effect-imparting pigment.

Examples of such pigments are inorganic-based pigments, such as titanium dioxide, iron oxide and carbon black, for example, or else conventional metal pigments (examples being commercial aluminum bronzes, stainless steel bronzes) and nonmetallic effect pigments (examples being pearlescent pigments and interference pigments). Color-imparting pigments on an organic basis as well, such as azo pigments and phthalocyanine pigments, may be employed. The fraction of pigments is situated for example in the range from 1 to 20 wt %, preferably 2 to 10 wt %, based in each case on the total amount of the pigmented aqueous basecoat material. The selection of the nature and amount of pigments to be used is made in the manner familiar to the skilled person and is guided by the properties desired or required for the coating composition. For further details, refer to Römpp-Lexikon Lacke and Druckfarben, Georg Thieme Verlag, Stuttgart, N.Y., 1998, page 451.

Besides water, furthermore, the pigmented aqueous basecoat material may also comprise organic solvents. Examples of those that may be present include aliphatic and/or aromatic hydrocarbons such as toluene, xylene, solvent naphtha, Solvesso 100, Shellsol A, ketones, such as acetone, methyl ethyl ketone or methyl amyl ketone, esters, such as ethyl acetate, butyl acetate, pentyl acetate or ethyl ethoxypropionate, ethers such as butyl glycol, dipropylene glycol methyl ether, alcohols such as ethylhexanol, butoxypropanol, isopropanol or butyl diglycol, or mixtures of the aforementioned solvents. Preference is given to using water-miscible organic solvents.

The pigmented basecoat material is aqueous. Aqueous is a specification familiar to the skilled person for coating compositions which as solvents do not exclusively comprise organic solvents but instead are also based on water as solvent. Aqueous in the context of the present invention means more particularly that the basecoat material of the invention contains preferably at least 10 wt %, more preferably at least 20 wt %, very preferably at least 25 wt % of water, based in each case on the total amount of the pigmented aqueous basecoat material. With particular preference, aqueous should be understood to mean that a further prerequisite to be met, in addition to the stated conditions "at least 10 wt % (or at least 20 or 25 wt %) of water, based on the total amount of the pigmented aqueous basecoat material" is that the fraction of organic solvents in said basecoat material is less than 25 wt %, more particularly less than 20 wt %, based in each case on the total amount of the pigmented aqueous basecoat material.

The pigmented aqueous basecoat material may additionally comprise at least one coatings additive. Nonexclusive examples of such coatings additives include the following:
  defoamers,
  reactive diluents,
  polymerization inhibitors,
  slip additives,
  wetting agents such as siloxanes, fluorine-containing compounds, carboxylic monoesters,
  catalysts, such as acidic phosphorus-containing catalysts based on, for example, substituted phosphonic diesters or substituted phosphoric esters,
  leveling agents,
  rheology control additives,
  dispersants,
  UV stabilizers,
  fillers such as silicon dioxide, aluminum silicate or barium sulfate,
  and/or flame retardants.

Coatings additives of these kinds are available for example commercially from various suppliers. The fraction of a particular additive is situated advantageously at not more than 10 wt %, more particularly at not more than 5 wt %, more preferably at not more than 3 wt %, based in each case on the total amount of the pigmented aqueous basecoat material.

The pigmented aqueous basecoat materials of the present invention may be employed in particular in automotive finishing but also in general industrial coating for the purpose of constructing a color-imparting coating, more particularly a color-imparting intermediate coating as part of a multicoat paint system, more particularly on a plastics substrate. Then, frequently, a clearcoat is constructed on the intermediate coating constructed as specified, thus producing the multicoat coating system.

Viewed in terms of its method, the preparation of the pigmented aqueous basecoat material does not exhibit any special features, but instead takes place in accordance with the customary and known methods, using customary and known mixing assemblies such as stirred tanks or dissolvers.

The coating films produced by means of the pigmented aqueous basecoat material of the invention possess excellent adhesion to plastics substrates. Where, for example, the resultant coating is exposed to weathering, then it is not possible, after a corresponding regeneration time, for any significant deterioration in adhesion to be observed. Moreover, the shelf life of the aqueous pigmented basecoat materials of the invention is outstanding.

The present invention further provides a method for producing a multicoat paint system on a plastics substrate, comprising
(A) applying the pigmented aqueous basecoat material of the invention to a plastics substrate, to give a first coat,
(B) drying the coat applied in (A),
(C) applying a second transparent coat, and
(D) jointly curing the coats applied in (A) and (C).

All of the features already discussed above with regard to the pigmented basecoat material of the invention are likewise preferred for the method of the invention that is under discussion.

Plastics Substrates to be Used

The pigmented aqueous basecoat material of the invention is suitable in particular for the coating of plastics substrates. The substrates in question are those made from customary plastics such as, for example, polystyrene (PS), polyvinyl chloride (PVC), polyurethane (PU), glass fiber-reinforced unsaturated polyesters, polymethyl methacrylate (PMMA), polyphenylene sulfide (PPS), polyoxymethylene (POM), polyphenylene ether (PPE), polyphenylene oxide (PPO), polyurea, polybutadiene terephthalate (PBT), polycarbonate (PC), acrylonitrile-butadiene-styrene copolymers (ABS), polyolefins such as polypropylene (PP), and polypropylene (PP) modified with ethylene-propylene-diene copolymers (EPDM). Also possible here are plastics substrates which comprise various of the plastics stated, hence mixtures of these plastics.

The pigmented aqueous basecoat material of the invention can be used, for example, for the coating of nonpolar plastics, such as, more particularly, polyolefins such as PP and PP modified with EPDM fractions. The modification of PP with EPDM serves essentially to elasticize the plastic, and is one of the factors determining the paintability. At low EPDM fractions, the paintability and adhesion are generally poor. Only for EPDM fractions of around 20 to 25 wt % are the plastics generally no longer referred to as plastics that are difficult to paint. The pigmented aqueous basecoat material of the invention is suitable more particularly for the painting of polypropylene/EPDM plastics with low EPDM fractions of, for example, not more than 25 wt %, more particularly not more than 20 wt %.

Furthermore, the pigmented aqueous basecoat material of the invention is suitable for the coating of polar plastics, such as, more particularly, polyurethanes, polycarbonates, or polycarbonates which have been modified with PBT. The pigmented aqueous basecoat material of the invention is especially suitable for the coating of polycarbonates whose PBT content is, for example, not more than 35 wt %, more particularly not more than 30 wt %.

The aqueous basecoat material of the invention is especially suitable for the coating of untreated plastics substrates. This means that no method, known to the skilled person, for pretreating plastics is employed, such as flaming, plasma treatment, wiping with solvents, or electrical surface treatment by means of corona discharge, for example.

The plastics substrates may be simple sheets or panels of plastics. Also possible as substrates, however, are vehicle bodies made from plastics, or particular vehicle parts, and also vehicle accessory parts and parts for installation in or on vehicles, for both the interior and exterior of the vehicles.

Production of Coatings on Plastics Substrates

The application of the pigmented aqueous basecoat material to a plastics substrate as described above may take place by any customary application techniques, such as, for example, spraying, knifecoating, spreading, pouring, dipping, impregnating, trickling or rolling, preferably by spray application. At application, the plastics substrate to be coated may itself be at rest, with the application equipment or unit being moved. Alternatively, the substrate to be coated may be moved, with the application unit being at rest relative to the substrate or being moved appropriately. Preference is given to using spray application techniques, such as, for example, compressed air spraying (pneumatic application), airless spraying, high-speed rotation, electrostatic spray application (ESTA), alone or in conjunction with hot spray application such as hot-air spraying, for example.

The pigmented aqueous basecoat material is applied in the customary and known coat thicknesses, as for example in wet film thicknesses of 10 to 200 micrometers, preferably of 50 to 150 micrometers. The resultant dry film thicknesses after curing are then for example in the range from 2 to 40 micrometers, more particularly 5 to 20 micrometers.

It is usual to apply a clearcoat film to the applied basecoat film. The basecoat film is preferably dried before the clearcoat is applied. The term "drying" for the purposes of the present invention refers to the removal of solvent from the applied coating material. Depending on the nature of the binder, there may of course already be crosslinking reactions occurring at this stage. Crosslinking, however, is not yet complete. This means that a fully cured coating film is not produced at this stage. What precisely is meant by the term "curing" will be elucidated in the further course of the description. Drying may take place initially at room temperature for 5 to 30, preferably 10 to 20, minutes and subsequently at temperatures of 30 to 90° C., more particularly 50 to 80° C., again for 5 to 30, preferably 10 to 20, minutes.

As is known, a clearcoat material is a coating material which following application and curing, forms a transparent coating (clearcoat film) having protective and/or decorative properties. Protective properties are, for example, scratch resistance and weathering resistance, more particularly UV resistance. A decorative property is, for example, good gloss. The clearcoat materials to be used are the clearcoat materials which are commonly used in the field of plastics coating and whose selection and use are known to the skilled person (in this regard, see also Römpp-Lexikon Lacke and Druckfarben, Georg Thieme Verlag, Stuttgart, N.Y., 1998, page 325).

The general application techniques for the clearcoat material correspond with those described earlier on above for the basecoat material.

The clearcoat material is applied at the customary and known coat thicknesses, as for example in wet film thicknesses of 50 to 250 micrometers, preferably of 100 to 180 micrometers. The resultant dry film thicknesses after curing are then for example in the range from 15 to 80 micrometers, more particularly 25 to 50 micrometers.

The curing of basecoat and clearcoat then takes place jointly. Curing has no peculiarities in terms of method, but instead take place in accordance with the customary and known methods such as, for example, heating in a forced-air oven or irradiation with IR lamps. Also possible is actinic curing by UV radiation, for example, in the case of radiation-curing systems. The curing conditions, more particularly the curing temperatures, are guided for example by the thermal sensitivity of the plastics substrates used and also by the aqueous coating compositions used—for example, by whether the particular aqueous coating composition used comprises self-crosslinking or externally crosslinking binders and optionally crosslinkers. Thus, for example, curing may take place in the region of room temperature or else at elevated temperatures in the range from for example 40° C. to 120° C., preferably from 60° C. to 90° C. The duration of the curing phase as well is selected individually and is dependent on factors including those already stated (for example, choice of binders and/or of curing temperatures). For example, curing may take place over a period of 5 to 120 minutes, preferably 10 minutes to 40 minutes. Curing may optionally also be preceded by a flashing or preliminary drying phase, for example at room temperature for a time of 1 to 60 minutes. Which curing conditions are to be employed for which substrates and/or coating compositions is part of the common general knowledge in the field, and so the conditions can be adapted and selected by the skilled person.

The plastics substrates thus coated are suitable overall for the esthetically and technically demanding area of vehicle finishing, more particularly of automobile finishing. The coated plastics substrates, especially the plastics substrates coated with a multicoat coating system, may be used as vehicle parts, and as vehicle accessory parts and parts for installation in and on vehicles, for both the interior and exterior of vehicles. Besides outstanding adhesion of the coatings or multicoat coating systems produced, it is possible, furthermore, to achieve a good and variable decorative effect.

The present invention further provides a multicoat paint system on a plastics substrate, comprising one above another in this order
(A) at least one first coating film resulting from the application of the pigmented aqueous basecoat material of the invention, and
(B) at least one second, transparent coating film.

Examples of plastics substrates which can be used are all those specified above. All features already discussed above with regard to the pigmented basecoat material of the invention are likewise preferred for the multicoat paint system of the invention. The second, transparent coating film is preferably a clearcoat film. As already described above, it is possible in principle for this purpose to use all clearcoat materials known to the skilled person. The multicoat paint system of the invention can be produced as described above already as part of the description of the pigmented aqueous basecoat material of the invention. It is preferred, moreover, for said plastics substrate to be untreated. What is meant by an untreated plastics substrate has already been set out above.

The present invention also provides, lastly, for the use of at least one alpha,omega-hydroxy-functionalized oligoester for improving adhesion in a pigmented aqueous basecoat material, wherein said alpha,omega-hydroxy-functionalized oligoester has an OH number of 25 to 95 mg KOH/g, a theoretical carbon-carbon double bond content of 0.5 to 2.5 mmol/g, a number-average molecular weight of 2500 to 6000 g/mol and a weight-average molecular weight of 15 000 to 30 000 g/mol, said alpha,omega-hydroxy-functionalized oligoester further comprising at least one partially or completely salified acid group, and the sum of the weight percentage fractions of all the alpha,omega-hydroxy-functionalized oligoesters being 0.5 to 10 wt %, based on the total solids fraction of the pigmented aqueous basecoat material.

All of the features already discussed above with regard to the pigmented basecoat material of the invention are likewise preferred for the inventive use under discussion.

Said alpha,omega-hydroxy-functionalized oligoester is employed preferably for improving adhesion on an untreated plastics substrate. What is known by an untreated plastics substrate has already been set out above.

The adhesion may be determined, for example, with the aid of the steam jet test in accordance with DIN EN ISO 66552 (Daimler parameter). The alpha,omega-hydroxy-functionalized oligoester of the invention is used preferably for improving the adhesion between plastics substrate and basecoat film. Likewise preferably, the alpha,omega-hydroxy-functionalized oligoester of the invention is used for improving the adhesion between plastics substrate and basecoat film after weathering. Such weathering may be simulated, for example, by the constant climate test in accordance with DIN EN ISO 6270-2 CH.

Furthermore, said alpha,omega-hydroxy-functionalized oligoester is used preferably in those pigmented aqueous basecoat materials, for improving adhesion, that are employed in OEM automotive finishing.

Measurement Methods
Determination of Solids:

Determining the solids in coating compositions is done in accordance with EN ISO 3251 (1 to 2 g, 1 hour, 125° C.). Approximately 2 g of sample are weighed out into a pre-dried aluminum dish and dried in a drying cabinet at 125° C. for 60 minutes, cooled in a desiccator and then reweighed. The residue, relative to the total amount of sample employed, corresponds to the solids fraction.

Determining the solids of the alpha,omega-hydroxy-functionalized oligoesters of the invention is done in accordance with EN ISO 3251 (1 g, 1 hour, 130° C.). In this case, 1 g of sample are weighed out into a pre-dried aluminum dish and dried in a drying cabinet at 130° C. for 60 minutes, cooled in a desiccator and then reweighed. The residue, relative to the total amount of sample employed, corresponds to the solids fraction.

Determination of the Acid Number:

The acid number is determined in accordance with DIN 53402. The free acids present in the sample are titrated with a potassium hydroxide standard solution in the presence of a color indicator. The acid number corresponds to the mass of potassium hydroxide, in mg, that is needed to neutralize 1 g of test material under specified conditions.

Determination of the OH Number:

The OH number is determined in accordance with DIN 53240. The OH groups are reacted by acetylation with an excess of acetic anhydride. The excess acetic anhydride is then split into acetic acid by addition of water, and the total acetic acid is back-titrated with ethanolic KOH. The OH number indicates the amount of KOH, in mg, which is equivalent to the amount of acetic acid bound in the acetylation of 1 g of substance.

Determination of the Number-Weighted and Mass-Weighted Molecular Weights:

The number-weighted and mass-weighted molecular weights are determined by means of gel permeation chromatography using tetrahydrofuran as eluent and a polystyrene standard. The column material consists of styrene-divinylbenzene copolymers. The alpha,omega-hydroxy-functionalized oligoester is measured in its neutralized form. Neutralization is carried out using DMEA.

The invention is elucidated in more detail by means of the following examples.

EXAMPLES

1. Preparation of the Alpha,Omega-Hydroxy-Functionalized Oligoesters for Use in Accordance with the Invention 1.1. Preparation of the Alpha,Omega-Hydroxy-Functionalized Oligoester (A) for Use in Accordance with the Invention The reactants identified in table 1 were reacted as set out below in the molar proportions indicated in said table.

First of all, maleic anhydride (MAn), adipic acid (AD) and 1,6-hexanediol (HD) were introduced into a 4-liter reactor made from stainless steel and equipped with a column, a condenser and a water separator. This was followed by addition of 3% of xylene as azeotrope former and 0.1% of methylhydroquinone (the percentage figures are based on the amount of MAn, AD and HD used). The resulting reaction mixture was heated under lean air over the course of 5 hours. Throughout the reaction period, the temperature of the reaction mixture did not exceed 230° C. When an acid number of 2 mg KOH/g, based on the oligoester, had been reached, the reaction mixture was cooled to 80° C. The resulting alpha,omega-hydroxy-functionalized oligoester (I) had the following characteristics:

OH number: 148 mg KOH/g
Acid number: 2 mg KOH/g
Number-average molecular weight: 1412 g/mol
Weight-average molecular weight: 3313 g/mol
Theoretical carbon-carbon double bond content: 1.87 mmol/g Then, trimellitic anhydride (TMAn) was added in situ. This was followed by slow heating to 160° C., this temperature being then retained until an acid number of mg KOH/g, based on the resulting oligoester, had been reached.

Following renewed cooling to 80° C., dimethylethanolamine (DMEA) was added over a period of 30 minutes. This was followed by the addition of water to set a solids content of 25 wt %, over a period of 30 minutes. The resulting dispersion was stirred at 80° C. for a further hour and then cooled to room temperature. The resulting alpha,omega-hydroxy-functionalized oligoester (A) for use in accordance with the invention had the following characteristics:

OH number: 58 mg KOH/g
Acid number: 35 mg KOH/g
Number-average molecular weight: 3618 g/mol
Weight-average molecular weight: 25 400 g/mol
Theoretical carbon-carbon double bond content: 1.66 mmol/g

TABLE 1.1

Amounts of substance of the reactants to be used, in mol.

| | Raw material | Amounts of substance |
|---|---|---|
| 1st stage | | |
| 1 | MAn | 2.48 |
| 2 | AD | 2.72 |
| 3 | HD | 7.01 |
| 2nd stage | | |
| 4 | TMAn | 0.95 |
| Neutralization | | |
| 5 | DMEA | 0.77 |
| 6 | Water | — |
| Solids [%] | | 25 |

1.2 Preparation of the Alpha,Omega-Hydroxy-Functionalized Oligoester (B) for Use in Accordance with the Invention The reactants identified in table 1.2 were reacted as set out below in the molar proportions indicated in said table.

First of all, maleic anhydride (MAn), adipic acid (AD), tricyclodecanediol (TCD) and 1,6-hexanediol (HD) were introduced into a 4-liter reactor made from stainless steel and equipped with a column, a condenser and a water separator. This was followed by addition of 3% of xylene as azeotrope former and 0.001% of methylhydroquinone (the percentage figures are based on the amount of MAn, AD, TCD and HD used). The resulting reaction mixture was heated under lean air over the course of 5 hours. Throughout the reaction period, the temperature of the reaction mixture did not exceed 230° C. When an acid number of 2 mg KOH/g, based on the oligoester, had been reached, the reaction mixture was cooled to 80° C. The resulting alpha,omega-hydroxy-functionalized oligoester (I) had the following characteristics:

OH number: 136 mg KOH/g
Acid number: 2 mg KOH/g
Number-average molecular weight: 1516 g/mol
Weight-average molecular weight: 3560 g/mol
Theoretical carbon-carbon double bond content: 1.81 mmol/g Then, TMAn was added in situ. This was followed by slow heating to 160° C., this temperature being then retained until an acid number of 32.7 mg KOH/g, based on the resulting oligoester, had been reached.

Following renewed cooling to 80° C., DMEA and water were added over a period of 30 minutes. The resulting dispersion was stirred at 80° C. for a further hour and then cooled to room temperature. The resulting alpha,omega-hydroxy-functionalized oligoester (B) for use in accordance with the invention had the following characteristics:

OH number: 56 mg KOH/g
Acid number: 32.7 mg KOH/g
Number-average molecular weight: 2278 g/mol
Weight-average molecular weight: 18 700 g/mol
Theoretical carbon-carbon double bond content: 1.63 mmol/g

TABLE 1.2

Amounts of substance of the reactants to be used, in mol.

| | Raw material | Amounts of substance |
|---|---|---|
| $1^{st}$ stage | | |
| 1 | MAn | 1.979 |
| 2 | AD | 1.804 |
| 3 | TCD | 2.502 |
| 4 | HD | 2.670 |
| $2^{nd}$ stage | | |
| 5 | TMAn | 0.693 |
| Neutralization | | |
| 6 | DMEA | 0.47 |
| 7 | Water | — |
| Solids [%] | | 34.8 |

2. Preparation of Black Aqueous Basecoat Materials Containing the Alpha,Omega-Hydroxy-Functionalized Oligoester A commercial black aqueous basecoat material was used. The composition is shown in table 2. The alpha,omega-hydroxy-functionalized oligoester was added by means of a dissolver. Compositions were prepared with 1.5%, 2.5%, 5% and 7.5% of the alpha,omega-hydroxy-functionalized oligoester (A) for use in accordance with the invention (additive). These are weight percentage figures relative to the total solids fraction of the black aqueous basecoat material.

TABLE 2

Composition of the black aqueous basecoat used. The wt % figures are based on the total amount of the basecoat material.

| Component | Amount (in wt %) |
|---|---|
| Commercial thixotropic agent (Laponite RD) | 18.2 |
| Water | 9.3 |
| Commercial dispersion of an OH-functional polyurethane resin (water content: 66.0 wt %, organic solvents: 6.3 wt %) | 31.2 |
| Commercial dispersion of an OH-functional polyester resin (water content: 17.7 wt %, organic solvents: 20.0 wt %) | 3.0 |
| Butoxypropanol | 2.0 |
| Cymel 327 (commercial melamine-formaldehyde resin) | 4.2 |
| TMDD BG 52 (commercial wetting agent) | 0.5 |
| DMEA 10% in water | 1.5 |
| Commercial dispersion of an OH-functional acrylate resin (water content: 49.5 wt %, organic solvents: 13.0 wt %) | 5.1 |
| Foamstar MF324 (commercial defoamer) | 0.5 |
| Ethylhexanol | 4.0 |
| BYK 347 (commercial wetting agent) | 0.5 |
| Pluriol P900 (commercial polyethylene glycol) | 2.0 |
| Isopropanol | 2.2 |
| Viscalex HV 30 (commercial rheological agent) | 0.4 |
| WBL tinting paste (10% dispersion of "Monarch 1400" carbon black pigment in water) | 10.1 |
| WBL tinting paste (50% dispersion of "Titanrutil 2310" pigment in water) | 0.04 |

Production of the Coated Plastics Substrates

Various plastics substrates were used, in each case in the form of test plates having a size of 10×10×0.3 cm. The plastics materials used were PC-PBT, PU and PP-EPDM.

The additized black aqueous basecoat material was applied pneumatically. The resulting basecoat film is dried initially at room temperature for 10 minutes and thereafter in a forced-air oven at 80° C. for a further 10 minutes.

This was followed by application of a clearcoat material. The composition of the clearcoat material used is shown in table 3. Joint curing of the applied aqueous basecoat and applied clearcoat materials takes place initially at room temperature for 10 minutes and thereafter in a forced-air oven at 80° C. for 30 minutes. In the resulting substrate, the basecoat has a dry film thickness of 15 micrometers and the clearcoat has a dry film thickness of 35 micrometers.

TABLE 3

Composition of the clearcoat used. The wt % figures are based on the total amount of the clearcoat material.

| Component | Amount (in wt %) |
|---|---|
| Parocryl AC 30.3 (solvent-containing acrylate resin) | 50.93 |
| Setal 82166 SS-55 | 25.51 |
| Cyclohexanone | 3.912 |
| Solvent Naphtha 230/290 | 1.955 |
| Parocryl AC 30.3 (solvent-containing acrylate resin) | 9.782 |
| Disolucion de Silicona F-2 | 1.535 |
| Flow control agent (5% strength solution of Baysilon OL44) | 0.488 |
| Tinuvin 292 (commercial light stabilizer) | 0.93 |
| Tinuvin 1130 (commercial UV absorber) | 0.93 |
| Catalyst (1% strength solution of dibutyltin dilaurate) | 0.587 |
| Cumyl hydroperoxide (80% form) | 0.391 |
| 1-Methoxyprop-2-yl acetate | 3.05 |

3. Investigation of the Adhesion Properties

The adhesion properties of the coatings produced were investigated by means of a steam jet test (DIN EN ISO 66552). In this test a jet of steam was directed perpendicularly onto the test specimen from a distance of 10 cm for one minute at a temperature of 60° C. and at 67 bar. A total of 6 samples were produced from each coating, and were each investigated individually. The average was subsequently formed.

The adhesion was evaluated using a rating system with ratings of 0 to 5, with a rating of 0 awarded for coatings which had no visible tracks after steam jet treatment (very good adhesion), and a rating of 5 for coatings which exhibited significantly detached regions after the steam jet test (inadequate adhesion).

Table 4 shows the adhesion properties of the coatings produced, as a function of the amount of additive used (alpha,omega-hydroxy-functionalized oligoester (A) for use in accordance with the invention). Accordingly, a significant improvement in adhesion can be achieved through the use of the alpha,omega-hydroxy-functionalized oligoester for use in accordance with the invention.

TABLE 4

Adhesion properties of the black aqueous basecoat + clearcoat system on plastics substrates (alpha, omega-hydroxy-functionalized oligoester (A) for use in accordance with the invention).

| Substrate | % Additive | Adhesion |
|---|---|---|
| PC-PBT[1] | 0 | 3.8 |
| | 1.5 | 2.8 |
| | 5 | 0.0 |
| | 7.5 | 0.0 |
| PU-RIM[2] | 0 | 2.6 |
| | 1.5 | 2.3 |
| | 5 | 2.0 |
| | 7.5 | 0.0 |

TABLE 4-continued

Adhesion properties of the black aqueous basecoat + clearcoat system on plastics substrates (alpha, omega-hydroxy-functionalized oligoester (A) for use in accordance with the invention).

| Substrate | % Additive | Adhesion |
|---|---|---|
| PP-EPDM[3] | 0 | 2.0 |
|  | 1.5 | 1.5 |
|  | 5 | 1.0 |
|  | 7.5 | 0.5 |

[1]PC-PBT, XENOY CL 101D (Sabic)
[2]PU—reaction injection molded (Bayer)
[3]108MF10 (Sabic)

4. Adhesion after Constant Climate Test

The black aqueous basecoat materials were prepared and applied as described above and then exposed to weathering in a climate chamber (constant climate test in accordance with DIN EN ISO 6270-2 CH). In this test, the samples were stored for 10 days in the climate chamber at 100% atmospheric humidity and 40° C. The adhesion of the samples was then investigated by means of the steam jet test, as already described above, 1 hour and 24 hours following removal from the climate chamber.

In each case 5% of the alpha,omega-hydroxy-functionalized oligoesters (A) and (B) for use in accordance with the invention, relative to the total solids fraction of the black aqueous basecoat material, was used. The results for the PC-PBT and PU-RIM substrates and for the alpha,omega-hydroxy-functionalized oligoester (A) for use in accordance with the invention, and also for PC-PBT in combination with the alpha,omega-hydroxy-functionalized oligoester (B) for use in accordance with the invention, are set out in tables 5.1 and 5.2. Accordingly, a significant improvement in adhesion can be achieved, after storage of the samples in a climate chamber, through use of the alpha,omega-hydroxy-functionalized oligoesters for use in accordance with the invention.

TABLE 5.1

Adhesion properties of the black aqueous basecoat + clearcoat system on plastics substrates (alpha, omega-hydroxy-functionalized oligoester (A) for use in accordance with the invention).

| Substrate | Sample | Time | Adhesion |
|---|---|---|---|
| PC-PBT | No additive | 1 h | 3.1 |
|  | 5 wt % (A) |  | 0.0 |
|  | No additive | 24 h | 4.2 |
|  | 5 wt % (A) |  | 0.0 |
| PU-RIM | No additive | 1 h | 3.1 |
|  | 5 wt % (A) |  | 0.6 |
|  | No additive | 24 h | 2.5 |
|  | 5 wt % (A) |  | 2.0 |

TABLE 5.2

Adhesion properties of the black aqueous basecoat + clearcoat system on PC-PBT (alpha, omega-hydroxy-functionalized oligoester (B) for use in accordance with the invention).

| Substrate | Sample | Time | Adhesion |
|---|---|---|---|
| PC-PBT | No additive | 1 h | 3.0 |
|  | 5% (B) |  | 0 |
|  | No additive | 24 h | 4.2 |
|  | 5% (B) |  | 0 |

6. Influence of the Pigment

One silver, one white and one red aqueous basecoat material were prepared. The compositions of said basecoat materials are shown in table 6.1. The alpha,omega-hydroxy-functionalized oligoesters (A) and (B) for use in accordance with the invention were added in different concentrations by means of a dissolver.

TABLE 6.1

Composition of differently pigmented aqueous basecoats (silver, white and red); all figures in wt % are based on the total weight of the respective basecoat material.

| Component | Silver | White | Red |
|---|---|---|---|
| Laponite (commercial thixotropic agent)) | 32.620 | 13.900 | 17.700 |
| Water | 13.500 | 10.800 | 16.450 |
| Commercial dispersion of an OH-functional polyurethane resin (water content: 66.0 wt %, organic solvents: 6.3 wt %) | 14.900 | 6.200 | 15.500 |
| Commercial dispersion of an OH-functional polyester resin (water content: 17.7 wt %, organic solvents: 20.0 wt %) | 7.600 | 4.100 | 5.000 |
| Melamine-formaldehyde resin (93% solids); isobutyl-/methyl-etherified | — | — | 4.100 |
| Butylglycol | 4.000 | 5.200 | 5.900 |
| Cymel 3020 (commercial melamine-formaldehyde resin) | — | 2.300 | — |
| Cymel 203 (commercial melamine-formaldehyde resin) | — | 4.500 | — |
| Cymel 1133 (commercial melamine-formaldehyde resin) | 3.500 | — | — |
| Neutralizing solution | 0.400 | 0.950 | 1.200 |
| Commercial dispersion of an OH-functional acrylate resin (water content: 49.5 wt %, organic solvents: 13.0 wt %) | — | 3.000 | — |
| Rheology additive thickener | — | 0.500 | — |
| Parocryl VP 567750 (commercial dispersion of an OH-functional acrylate resin in organic solvents) | 5.100 | — | 4.400 |
| Viscalex solution | 4.000 | — | — |
| Polyester-based matting paste | — | 2.300 | — |
| Ethylhexanol | — | 1.500 | 1.400 |
| Nacure 2500 | — | — | 0.700 |
| TMDD BG 54 (commercial wetting agent) | 2.000 | — | — |
| BYK 346 (commercial wetting agent) | — | — | 0.600 |
| Pluriol P900 (commercial polyethylene glycol) | 1.000 | 1.000 | 1.600 |
| Polyacrylate-based blue tinting paste | 0.040 | — | — |
| Polyacrylate-based white tinting paste | 0.200 | — | — |
| Polyurethane-polyester-based black tinting paste | — | 0.130 | 0.800 |
| Polyurethane-based green tinting paste | — | 0.004 | — |
| Polyacrylate-based white tinting paste | — | 36.300 | — |
| Polyacrylate-based yellow tinting paste | — | 0.150 | — |
| Polyacrylate-based red tinting paste | — | — | 12.000 |
| Aluminum effect pigment (solids content = 65%) | 5.340 | — | — |
| Dipropylene glycol methyl ether | 5.000 | — | — |
| Red pigment | — | — | 2.700 |
| Effect pigment based on mica | — | — | 2.200 |

The coating materials were additized as described above with different amounts of the alpha,omega-hydroxy-functionalized oligoesters (A) and (B) for use in accordance with the invention. The resulting basecoat materials were applied to PC-PBT substrates and their adhesion was investigated by means of the steam jet test. The results are set out in tables 6.1 and 6.2. Accordingly, a significant improvement in the adhesion can be achieved through the use of the alpha, omega-hydroxy-functionalized oligoester for use in accordance with the invention.

TABLE 6.2

Adhesion properties of the aqueous basecoat + clearcoat system on PC-PBT for basecoats with different colors (alpha, omega-hydroxy-functionalized oligoester (A) for use in accordance with the invention).

| Substrates | % Additives | Adhesion (white) | Adhesion (silver) |
|---|---|---|---|
| PC-PBT | 0 | 4.7 | 5 |
|  | 2.5 | 0 | 0.2 |
|  | 5 | 0 | 0 |
|  | 7.5 | 0 | 0 |

TABLE 6.3

Adhesion properties of the aqueous basecoat + clearcoat system on PC-PBT for basecoats with different colors (alpha, omega-hydroxy-functionalized oligoester (B) for use in accordance with the invention).

| Substrate | % Additives | Adhesion (white) | Adhesion (red) | Adhesion (silver) |
|---|---|---|---|---|
| PC-PBT | 0 | 4.7 | 3.2 | 5 |
|  | 2.5 | 0 | 0 | 0 |
|  | 5 | 0 | 0 | 0 |
|  | 7.5 | 0 | 0 | 0 |

7. Influence of Storage

The black aqueous basecoat materials were prepared as described above. In each case 7.5% of the alpha,omega-hydroxy-functionalized oligoesters (A) and (B) for use in accordance with the invention, relative to the total solids fraction of the black aqueous basecoat material, was used. The basecoat materials thus prepared were stored at room temperature for a total of seven months. After one, three and seven months, the basecoat materials were applied as described in section 3 to a PC-PBT substrate, and the adhesion was investigated by means of the steam jet test. The results are set out in table 7. Accordingly, no significant deterioration can be found in the resultant adhesion properties even after several months of storage.

TABLE 7

Adhesion properties of the aqueous basecoat + clearcoat system on PC-PBT after storage; (A): alpha, omega-hydroxy-functionalized oligoester (A) for use in accordance with the invention, (B): alpha, omega-hydroxy-functionalized oligoester (B) for use in accordance with the invention.

| Time (months) | Additive | Adhesion |
|---|---|---|
| 0 | No additive | 5 |
|  | (A) | 0 |
|  | (B) | 0 |
| 1 | No additive | 5 |
|  | (A) | 0 |
|  | (B) | 0 |
| 3 | No additive | 5 |
|  | (A) | 0 |
|  | (B) | 0.5 |
| 7 | No additive | 5 |
|  | (A) | 0 |

The invention claimed is:

1. A pigmented aqueous basecoat material comprising: at least one alpha, omega-hydroxy-functionalized oligoester which possesses an OH number of 25 to 95 mg KOH/g, a theoretical carbon-carbon double bond content of 0.5 to 2.5 mmol/g, a number-average molecular weight of 2500 to 6000 g/mol and a weight-average molecular weight of 15 000 to 30 000 g/mol, the alpha, omega-hydroxy-functionalized oligoester further comprising at least one partially or completely salified acid group, and the sum of the weight percentage fractions of all the alpha, omega-hydroxy-functionalized oligoesters being 0.5 to 10 wt %, based on the total solids fraction of the pigmented aqueous basecoat material.

2. The pigmented aqueous basecoat material according to claim 1, wherein the sum of the weight percentage fractions of all the alpha, omega-hydroxy-functionalized oligoesters is 1.5 to 7.5 wt %, based on the total solids fraction of the pigmented aqueous basecoat material.

3. The pigmented aqueous basecoat material according to claim 1, wherein the at least one alpha, omega-hydroxy-functionalized oligoester is the reaction product of:
  (i) at least one alpha, omega-hydroxy-functionalized oligoester (I) which possesses an OH number of 30 to 170 mg KOH/g, a theoretical carbon-carbon double bond content of 1 to 2.5 mmol/g, a number-average molecular weight of 800 to 2200 g/mol and a mass-weighted molecular weight of 1000 to 6000 g/mol,
  (ii) with at least one cyclic dicarboxylic anhydride of the structural formula (I):

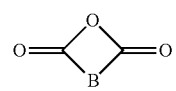

(I)

wherein B is an aliphatic or aromatic radical which contains at least one acid group,
with the proviso that the carboxylic acid groups resulting from the opening of the dicarboxylic anhydride group of the cyclic dicarboxylic anhydride of the structural formula (I) are reacted completely with the alpha, omega-hydroxy-functionalized oligoester (I), to form an ester bond in each case, and
  (iii) the at least one acid group is partially or completely salified.

4. The pigmented aqueous basecoat material according to claim 1, wherein the alpha, omega-hydroxy-functionalized oligoester possesses the structural formula (II):

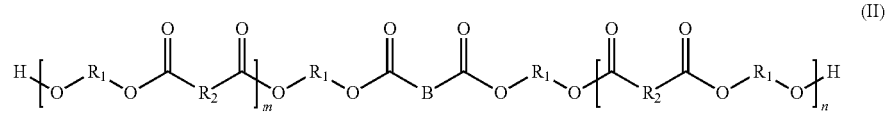

(II)

where
the (m+n+2) radicals $R_1$ independently of one another are selected from the group of linear or cyclic alkylene radicals,
the (m+n) radicals $R_2$ independently of one another are selected from the group of alkylene or alkenylene radicals, the ratio of alkylene to alkenylene radicals being just selected such that the alpha, omega-hydroxy-functionalized oligoester of the structural formula (II) possesses a theoretical carbon-carbon double bond content of 0.5 to 2.5 mmol/g,
the indices m and n are selected such that the number-average molecular weight of said alpha,omega-hydroxy-functionalized oligoester of the structural formula (II) is 2500 to 6000 g/mol, and
the radical B is an aliphatic or aromatic radical which contains at least one acid group which is partially or completely salified.

5. The pigmented aqueous basecoat material according to claim 4, wherein the alpha, omega-hydroxy-functionalized oligoester of the structural formula (II) possesses a number-average molecular weight of 3500 to 4500 g/mol.

6. The pigmented aqueous basecoat material according to claim 4, wherein the alpha, omega-hydroxy-functionalized oligoester of the structural formula (II) possesses a weight-average molecular weight of 20 000 to 26 000 g/mol.

7. The pigmented aqueous basecoat material according to claim 5, wherein the (m+n) radicals $R_2$ of the structural formula (II) are selected from the group consisting of linear alkylene radicals having 4 to 8 carbon atoms and linear alkenylene radicals having 2 to 4 carbon atoms.

8. The pigmented aqueous basecoat material according to claim 5, wherein the (m+n+2) radicals $R_1$ of the structural formula (II) are selected from the group consisting of linear alkylene radicals having 6 to 10 carbon atoms.

9. The pigmented aqueous basecoat material according to claim 5, wherein the (m+n+2) radicals $R_1$ of the structural formula (II) are selected from the group consisting of linear alkylene radicals having 6 to 10 carbon atoms and cyclic alkylene radicals having 6 to 10 carbon atoms.

10. The pigmented aqueous basecoat material according to claim 5, wherein the radical B is a radical $A(Q)_K$, wherein
A is an aliphatic or aromatic radical,
the radical Q is a partially or completely salified acid group, and
K=1 to 3.

11. The pigmented aqueous basecoat material according to claim 10, wherein A is a benzene radical, in which the two carboxylic ester groups of structural formula (II) are each located in alpha-position to one another, and K=1.

12. The pigmented aqueous basecoat material according to claim 11, wherein Q is a partially or completely salified carboxylic acid group.

13. A multicoat paint system on a plastics substrate, comprising one above another in this order:
(A) at least one first coat, resulting from the application of the pigmented aqueous basecoat material according to claim 1, and
(B) at least one second, transparent coat.

14. A method for producing a multicoat paint system on a plastics substrate, comprising:
(A) applying the pigmented aqueous basecoat material according to claim 1 to a plastics substrate, to give a first coat,
(B) drying the coat applied in (A),
(C) applying a second, transparent coat, and
(D) jointly curing the coats applied in (A) and (C).

15. A method for improving adhesion in a pigmented aqueous basecoat material comprising:
mixing at least one alpha, omega-hydroxy-functionalized oligoester having an OH number of 25 to 95 mg KOH/g, a theoretical carbon-carbon double bond content of 0.5 to 2.5 mmol/g, a number-average molecular weight of 2500 to 6000 g/mol and a weight-average molecular weight of 15 000 to 30 000 g/mol, the alpha, omega-hydroxy-functionalized oligoester further comprising at least one partially or completely salified acid group, and the sum of the weight percentage fractions of all the alpha, omega-hydroxy-functionalized oligoesters being 0.5 to 10 wt %, based on the total solids fraction of the pigmented aqueous basecoat material with one or more pigmented aqueous basecoat material components to form the pigmented aqueous basecoat material.

* * * * *